April 23, 1968  V. CERNY  3,380,033
COMPUTER APPARATUS
Filed Sept. 2, 1965  2 Sheets-Sheet 2

INVENTOR.
Václav Černý
BY

United States Patent Office 3,380,033
Patented Apr. 23, 1968

3,380,033
COMPUTER APPARATUS
Václav Černý, Prague, Czechoslovakia, assignor to Výzkumný ústav matematických strojů, Prague, Czechoslovakia
Filed Sept. 2, 1965, Ser. No. 484,529
Claims priority, application Czechoslovakia, July 17, 1963, 4,141/63
6 Claims. (Cl. 340—172.5)

ABSTRACT OF THE DISCLOSURE

A main data memory, an auxiliary storage and a control unit are connected in parallel with each other. The auxiliary storage permanently stores a plurality of predetermined programs. An actuating circuit for actuating the auxiliary storage enables read out from the auxiliary storage to the control unit for a time sufficient to read-out an entire predetermined program. A manually controlled keyboard controls the actuating circuit to control the direct transfer of a program from the auxiliary storage to the control unit.

---

Figure 1:
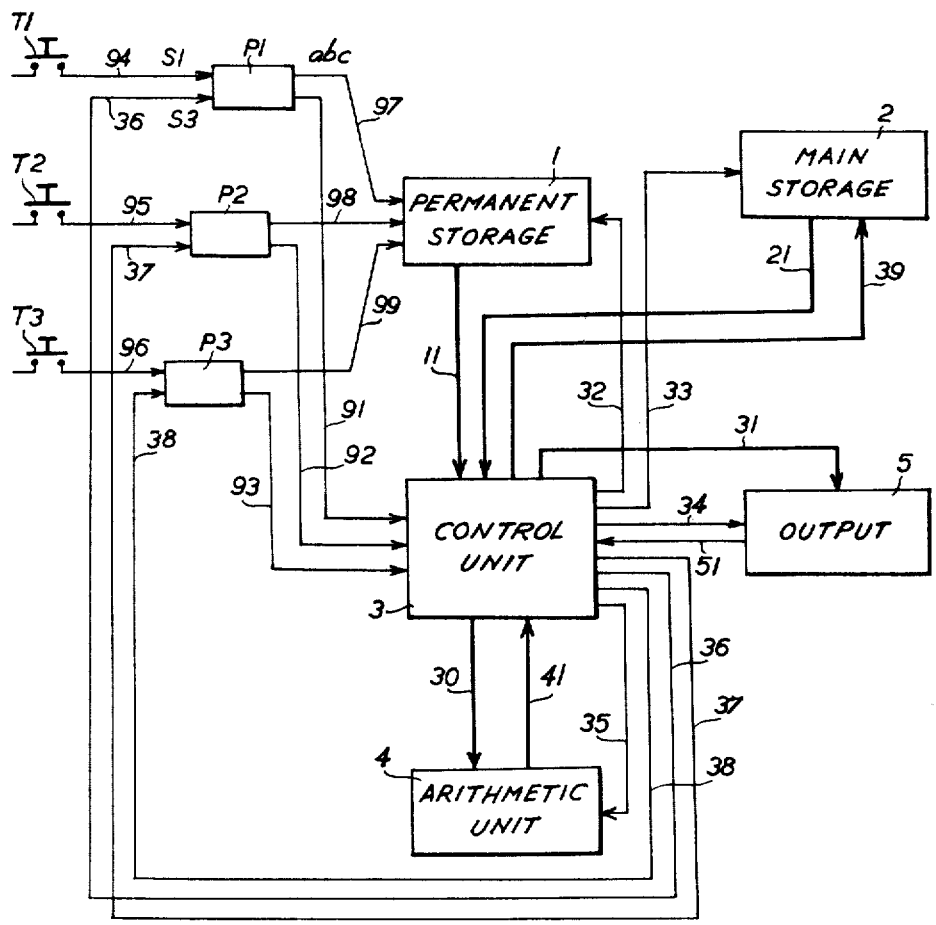

The present invention relates to computer apparatus, and more particularly to automatically operated computers.

Automatic computers have two main operating cycles; one, in which the machine operates entirely automatically in accordance with a program which is placed into a memory or storage unit, without any human intervention into the sequential carrying-out of the program at all. On the other hand, it is often necessary to interfere, manually, with the entire automatic operation. Examples of such manual interference with the automatic operation may be filling of the memory with a program, control of the program, interruption of computer apparatus when an error is indicated, for example when the state of a register in the control, or command network has to be determined in order to stop operation of the equipment, or to continue operation of the equipment after interruption, or malfunction; malfunction due to an erroneous or incomplete program; malfunction due to component failure in the apparatus; and many other cases. Each computer therefore must, beside its automatic operation, provide means to enable manual intervention. This is usually accomplished by a series of buttons or keys, mounted on the control console, which keys or buttons are operated in order to carry out the operations above indicated.

Known equipment utilizes keys, or pushbuttons, in order to control elements within the equipment itself, for example a pulse source, and to cycle pulses to the appropriate gate circuits necessary in a certain operation. Thus, at least a portion of the control or command network of a computer can be operated manually. In case of simple operations, there is no great difficulty involved; when complicated programs come, however, to be carried out, then comparatively complicated networks and circuits are necessary, requiring also additional circuit elements therein. Operating one or more of the control pushbuttons or keys then operates a larger number of elements. This again requires further pulse trains from the pulse source. It can readily be seen that providing for human intervention in a computer program increases the complexity and the cost of the computer equipment.

It is an object of the present invention to permit manual intervention in a program, and manual setting of a test or sub-routine program in a computer without substantially increasing its complexity.

Briefly, in accordance with the present invention, certain standard or routine programs are arranged in a special storage means and actuated or read into the computer by the use of a specific operating key or pushbutton. Thus, in accordance with the invention, an auxiliary storage means or memory is arranged parallel to the main memory of the computer, controlled by the command of the computer similarly to the control of the main memory, and further connected by means of a sensing or feedback line to the computer to provide for sensing or proper execution of the program. This auxiliary storage device, or auxiliary memory, may contain a number of programs permanently, and may be termed a permanent storage, or permanent memory element. This permanent memory element is connected to the keys of the control console by means of further short-time-memory circuits, which are so arranged that they energize the permanent memory upon operation of an appropriate key, for such a period of time as is required by the program set into the auxiliary memory.

Figure 2:
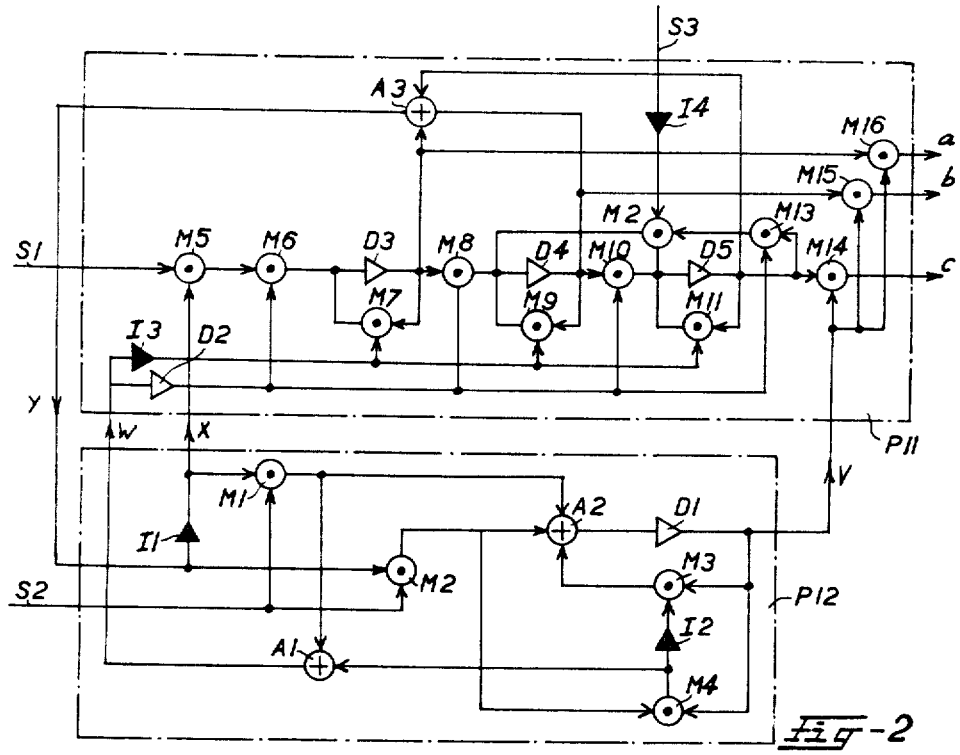
Figure 3:
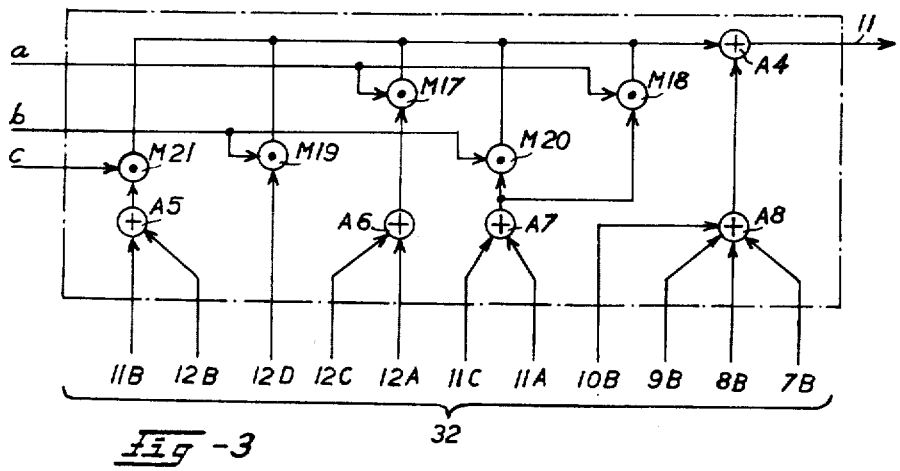

The structure, organization and operation of the invention will now be described more specifically in the following detailed description with reference to the accompanying drawings, in which:

FIG. 1 illustrates, in block diagram form, an embodiment of the invention;
FIG. 2 is a schematic diagram of the short-time memory, and
FIG. 3 is a schematic diagram of a portion of the auxiliary memory.

Referring now to the drawings, and in particular to FIG. 1, those connection lines which contain control and supervisory impulses are shown in thin lines; the connection lines, which contain information data, are shown in heavy lines. The direction of transfer of information, or of propagation of pulses is indicated by arrows.

The computer according to the present invention has the usual control or command unit 3, a main storage or memory section 2, arithmetic unit 4, and input-output equipment 5. The control console is provided with keys schematically indicated as pushbutton switches T1, T2, T3; any number of such keys may be used. These keys are effective to operate the control unit 3. According to the invention, a permanent memory, or auxiliary storage unit 1 is provided, which contains a group of fixed, unchangeable programs, which may be test programs or sub-routines. They may be unchangeable in the sense that the connections are soldered in, or they may be unchangeable electrically and be capable of being reconnected manually by means of a plug board. Auxiliary memory 1 is controlled by means of short-term storage circuits, P1, P2, and P3 over circuits 97, 98, 99 respectively. Each one of the short-time, or short-term memories P1, P2, P3 in turn is controlled over the pushbuttons T1, T2, T3 over control lines 94, 95, 96 respectively. Additionally, short-term memories P1, P2, P3 are connected by means of lines 36, 37, 38 respectively, to the control unit 3.

Lines 36, 37, 38 transmit signals from the control unit, one of which is shown as S3, to the short-term memory units P1, P2, P3 in order to interrupt read-out of signals from the short-term memory units P1, P2, P3 to the auxiliary storage unit 1. Short-term memory unit P1, for example, controls directly over line 91 the control unit or, in accordance with the invention, starts read-out from the permanent auxiliary memory 1. The other short-term units P2, P3, etc., additional similar units of which may be included and are not shown in the drawing, are likewise actuated, or energized by means of keys T2, T3, etc.

Auxiliary storage unit 1 transmits information over line 11 to the control unit 3, in a manner similar to the transmission of information from the main storage unit 2 over 21. Since there will be no return flow of new, or processed information from the control unit to storage, there is no line from control unit 3 to permanent storage 1 which would correspond to the return line 39 from control unit 3 to main storage element 2. Control unit 3 has an additional line, 32, connected to the permanent storage to transmit "housekeeping" signals and the like and signals indicating the termination of a program. A similar line 33 is provided from control unit 3 to the main storage 2, as is known in the art.

Control unit 3 is connected to arithmetic unit 4 by means of a pair of lines carrying data information 30, 41, and by a control line 35. Output equipment 5 receives data over line 31, and controlled information over lines 34, 51. If this output equipment is to serve also as an input, an additional line similar to line 31 (not shown) and having information flow from unit 5 to unit 3 would be provided; such a line may merely be time shared with line 31.

In order to provide a reasonable number of different pulse sequences or programming steps, with a minimum number of equipment, it is preferred that each one of the lines 97, 98, 99 interconnecting short-term storage units P1, P2, P3 with the auxiliary storage unit 1, actually consist of a plurality of connections, indicated at line 97 only as a, b, c. Signals on these three lines a, b, c, of any one of the connections 97, 98, 99 then will cause different sequences of pulses as will appear in detail below.

Referring next to FIG. 3, wherein a logical network of that portion of the auxiliary storage unit 1 is shown, in will be seen that input lines a, b, c selectively energized various gates. Output line 11, shown in FIG. 1 and in FIG. 3, is also indicated.

Pulses, in the clock cycle of the computer, are obtained over line 32 (see also FIG. 1). An explanation of the symbols for the pulses will make the operation clear. The Arabic letters indicate the group of pulses within a pulse train, and the alphabetic letter the number of the pulse within one particular group. Thus, 7B is the second pulse of the seventh group; 12C the third pulse of the twelfth group, etc. The circuit according to FIG. 3 contains five OR gates, A4, A5, A6, A7, and A8, and five AND gates M17, M18, M19, M20, and M21. These gates are so connected that the instructions from connections a, b, c, from unit P1, for example, combine the pulses in a desired pattern or program. Pulse sequences, as shown in the table below, will be caused by the energization of the lines a, b, c, according to the table below, if wired in accordance with FIG. 3:

TABLE I

Actuate a: 7B, 8B, 9B, 10B, 11A, 11C, 12A, 12C
Actuate b: 7B, 8B, 9B, 10B, 11A, 11C, 12D
Actuate c: 7B, 8B, 9B, 10B, 11B, 12B As seen from the above table, OR gate A8 will form a logical addition according to Boolean algebra of pulses 7B, 8B, 9B, 10B; OR gate A7 will add 11A, 11C; AND gate M18 will pass these pulses upon energization of line a; and OR gate A4 will add all pulses together. Similarly, pulses will be selected by selective energization of lines b, c. These pulses then are passed, in series, over line 11 to the control unit in order to operate the appropriate portions within the computer.

The above discussion merely is an illustration of the inventive concept, and the particular programs both within the short-term memories P1, P2, P3 or in the auxiliary storage unit 1, and as more particularly shown in FIG. 3, may be changed to suit any particular system, or design. It is of course also possible to utilize the present invention in connection with computer equipment having more than one main storage unit 2, and provides for selective energization of either the permanent storage unit 1, or any one of the other computer storage units which may be desired.

FIG. 2 illustrates an example of a logical circuit for a short-term memory P1. For convenience, an actual example of a circuit was built in two separate sub-units, P11 and P12. In essence, P11 is a shift register and P12 is a sorting and selective energization circuit. The shift register P11 contains twelve circuits for logical multiplication, AND gates M2, M5, M6 . . . M16; a circuit for logical addition, OR gate A3; four delay elements causing delay by one clock pulse, D2, D3, D4, and D5; and two elements which cause delay by one clock pulse, or cycle, and further inversion inverters I3 and I4. The circuit P12 contains four AND gates M1, M2, M3, and M4, and two OR gates A1 and A2, a delay element D1, and two inverters I1 and I2. The signal path S1 shows a pulse from the key or pushbutton T1; pulses S2 are synchronizing signals, generated in each cycle. S3 indicates a clearing or erase signal, obtained from the command network 3 over line 36 at an instant of time, when the operation of the unit P1 is to stop. Since the circuit P12 generates the necessary pulses only in every other cycle on the basis of the signals S1 derived from key T1 and the synchronizing pulses S2, the shift register P11 operates only at every other cycle and permits signals at the outputs a, b, c, for application to lines a, b, c (FIG. 3) only at every other cycle.

The function of the circuit according to FIG. 2 is clear and apparent from the schematic diagram. In particular, in the illustrated example, instructions a, b, c are to be fed to the permanent memory 1 in succession according to Table II.

TABLE II

| Cycle number | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Output signal | — | a | — | b | — | c | — | b | — | c | — | b | — | c | — | b | — | c |

From Table II it can be seen that only every second cycle the shift register P11 is to send out a signal. For this purpose, the block P12 is so wired that each second keying impulse S2 is fed to the block P11 as a pulse W from OR gate A1. The gate is connected to S2 via AND gate M1, which is open for the pulse S2 when no signal Y, signalling activity of the shift register P11, is present. The signal Y is supplied from OR gate A3 to the AND gate M1 via the inverter I1. The pulse Y is absent when the shift register P11 is empty, that is, at the start of operation. When register P11 is in action, the AND gate M1 is closed, and pulses to OR gate A1 pass from AND gate M4, which is connected to the circulating memory cell, which consists of delay-element D1, AND gate M3 and OR A2, and is connected to AND gate M2 which opens for the pulse S2 when the pulse Y is present. The inverter I2 ensures the closing of AND gate M3 the following clock pulse. The output of D1 is a series of pulses V which are synchronous with the clock pulses, but appear only every second cycle such as, for example in cycles of even number 2, 4, 6 . . .

The working pulse W is issued from OR gate A1 synchronously with the keying pulse S2, but also only in cycles of even numbers. The operative parts of the shift register P11 are three memory cells, comprising delay elements D3, D4, D5. The pulse W is fed to the AND gates M6, M7, M8, M9, M10, M11, M13, and controls the three memory cells via the delay element D2 and inverter I3 in such a way that with no pulse W the gates M7, M9, M11 are open, the gates M6, M8 and M10 are closed, and the stored data circulate in said three cells D3, M7; D4, M9; D5, M11. An incoming pulse W closes the AND gates M7, M9 and M11, and opens the AND gates M6, M8, M10, M13; and the data pass on from one cell to another: from D3 to D4, from D4 to D5, and from D5 through the AND gate M13 and AND gate M12, open in the absence of the pulse S3, and back into the cell D4. The cell of delay-element D3 is connected to AND gate M16, the cell of D4 to M15, and the cell of D5 to M15. All three output gates M14, M15, M16 are governed by already mentioned pulses V generated in the cell D1, M3 of the circuit P12 during each second cycle. By this, the output of $a$, $b$, $c$ only in cycles of even numbers is ascertained. The presence of pulse S3 closes the gate M12 and thus stops the operation of the circuits. The outputs of the three memory cells D3, D4, D5 are connected to OR gate A3 in order to indicate to circuit P12 by the signal Y whether circuit P11 is in operation. The starting pulse S1 from pushbutton or key passes first the locking gate M5, which is closed if the circuits are already in operation, and then, when the next keying pulse S2 has opened the AND gate M6, into the first memory cell D3. The signal passes from the cell D3, delayed by one hand clock pulse, to the output $a$, and on the other hand, keeps circulating in the circuit D3, M7 until the next pulse W arrives; that is when two cycles have been completed. At that time, the pulse from D3 passes to D4 and a clock pulse passes later to the output $b$, while circulating in circuit D4, M9, the next two cycles. It can be seen that the arrangement of the circuitry as shown in FIG. 2 assures the operation of outputs $a$, $b$, $c$ according to Table II.

The present invention has been described in terms of block diagrams and schematic diagrams. It will be obvious to those skilled in the art that the logic and particular components and elements indicated by the block diagrams and interconnections may be implemented by a variety of well-known circuitry. It is therefore thought unnecessary to describe the exact components on a level more detailed than that required for understanding by those skilled in the art. It is also to be understood that appropriate interlock or buffer circuit paths are to be provided when necessary, in accordance with good design techniques, to prevent feedback of signals or undesirable circuit paths which might influence other circuits to respond spuriously and not in accordance with the inventive concept. Such buffers and interlock circuits are not shown in the drawings, and the detailed description thereof has been omitted in the interest of clarity and brevity. Their proper use will be obvious to those skilled in the art.

The logic elements described and shown in the drawings and utilized by the apparatus of the present invention are known in the art and described in various publications, for example, in the book entitled "Design of Transistorized Circuits for Digital Computers," by A. I. Pressman: John F. Ryder, Publisher, Inc., New York, 1959. Reference may also be had to "Arithmetic Operations in Digital Computers," by R. K. Richards: D. Van Nostrand Company, Inc., Princeton, 1955; and to "High-Speed Computing Devices," by Engineering Research Associates (ed W. W. Stifler, Jr.): McGraw-Hill Book Company, Inc., New York, 1950.

I claim:

1. Computer apparatus comprising main data storage means; auxiliary storage means connected in parallel with said main storage means and permanently storing a plurality of predetermined programs; a control unit connected in parallel with said main data storage means and said auxiliary storage means; actuating means for actuating said auxiliary storage means, said actuating means including enabling means enabling read-out from said auxiliary storage means to said control unit for a time sufficient to read out an entire predetermined program therefrom; manually operable keyboard means for controlling said actuating means to control the direct transfer of a program from said auxiliary storage means to said control unit; and means interconnecting said control unit and said auxiliary storage means to terminate read-out and to disable interconnection of data from said auxiliary storage means to said control unit.

2. Computer apparatus as claimed in claim 1 including means for connecting a computer clock pulse source to said auxiliary storage means to control said time of read-out of data from said auxiliary storage means into said control unit.

3. Computer apparatus as claimed in claim 1, wherein said auxiliary storage means has pre-set interconnections determining a plurality of programs; and said actuating means selectively actuates any one of said plurality of programs.

4. Computer apparatus as claimed in claim 3, wherein said pre-set interconnections are arranged in groups of predetermined logical connections, and said actuating means sequentially enable said groups for connection to the control unit.

5. Computer apparatus as claimed in claim 1, wherein said actuating means is manually controllable to select a particular program as determined by said pre-set interconnections.

6. Computer apparatus comprising a main memory; auxiliary storage means connected in parallel with said main memory and having a plurality of logic networks for determining permanently preset programs; a control unit connected in parallel with said main memory and said auxiliary storage means; actuating means for sequentially enabling the logic networks of said auxiliary storage means to read said preset programs into said control unit; manually operable keyboard means for controlling said actuating means to control the direct transfer of a program from said auxiliary storage means to said control unit; and means interconnecting said control unit and said auxiliary storage means for disconnecting said auxiliary storage means under the control of said control unit.

References Cited

UNITED STATES PATENTS

| | | | |
|---|---|---|---|
| 3,260,997 | 7/1966 | Arndt et al. | 340—172.5 |
| 3,221,309 | 11/1965 | Benghiat | 340—172.5 |
| 3,077,579 | 2/1963 | Greene et al. | 340—172.5 |
| 3,039,690 | 6/1962 | Yandell | 340—172.5 |
| 3,000,555 | 9/1961 | Innes | 235—61.6 |
| 2,987,704 | 6/1961 | Gimpel et al. | 340—172.5 |

ROBERT C. BAILEY, *Primary Examiner.*

GARETH D. SHAW, *Examiner.*